United States Patent [19]

Blum

[11] Patent Number: 4,692,973

[45] Date of Patent: * Sep. 15, 1987

[54] DRILLING AND MOUNTING MACHINE FOR FURNITURE PRODUCTION

[75] Inventor: Dietmar Blum, Höchst, Austria

[73] Assignee: Julius Blum Gesellschaft m.b.H., Höchst, Austria

[*] Notice: The portion of the term of this patent subsequent to Sep. 30, 2003 has been disclaimed.

[21] Appl. No.: 759,285

[22] Filed: Jul. 26, 1985

[30] Foreign Application Priority Data

Aug. 27, 1984 [AT] Austria ................................ 2726/84

[51] Int. Cl.⁴ ........................ B23P 23/04; B23P 19/04
[52] U.S. Cl. .................................. 29/33 K; 29/26 A; 144/92
[58] Field of Search ................... 29/33 K, 26 A, 26 B, 29/35; 248/123.1, 125, 297.1, 635; 408/129, 130, 136, 712; 144/92

[56] References Cited

U.S. PATENT DOCUMENTS

| Re. 15,864 | 6/1924 | Grau ..................................... 408/712 |
| 1,060,173 | 4/1913 | Edwards . | |
| 2,082,103 | 6/1937 | Fox et al. ............................ 408/130 |
| 2,214,666 | 9/1940 | Elf et al. . | |
| 2,361,184 | 10/1944 | Ellis et al. ........................... 248/635 |
| 2,374,774 | 5/1945 | Olsen ................................... 408/130 |
| 2,444,228 | 6/1948 | Huthsing ............................. 408/130 |
| 3,389,413 | 6/1968 | Van Der Kieboom ............. 408/130 |
| 4,100,661 | 7/1978 | Cheak . | |

FOREIGN PATENT DOCUMENTS 356875 5/1980 Austria .
2110924 9/1972 Fed. Rep. of Germany ...... 408/712

Primary Examiner—John Sipos
Assistant Examiner—Donald R. Studebaker
Attorney, Agent, or Firm—Wenderoth, Lind & Ponack

[57] ABSTRACT

A drilling and mounting machine for furniture production suitable for the drilling of holes as well as for the insertion of dowels or hinge casings into drilled holes is operable by hand or by means of a lever, as well as by means of a pneumatic or hydraulic cylinder. A fastening plate is screwable to a housing of the machine and a pneumatic or hydraulic piston-cylinder unit may be fastened to such fastening plate to actuate the feed of the machine.

6 Claims, 4 Drawing Figures

DRILLING AND MOUNTING MACHINE FOR FURNITURE PRODUCTION

FIELD AND BACKGROUND OF THE INVENTION

The invention relates to a drilling and mounting machine for furniture production for the drilling of holes and for the insertion of dowels, mounting plates, hinge casings and the like, and of the type including a housing displaceable on vertical guide columns, a driving motor and a gear block for a number of drill spindles mounted on the housing, a feed device formed by levers actuable by hand and connected to the housing and to a console fixed to the guide columns, and including a pivotal lever carrying an inserting unit for fittings.

Automatic drilling machines are known in the furniture production industry and include drill beams with rows of drill spindles by means of which holes can be drilled into the faces and sides of plate-shaped furniture parts. The drill beams may be pivotally mounted. In the drilling rows, the drills are generally arranged at spaced intervals of 32 mm, the so-called system distance.

Furthermore, drilling machines are known which are particularly used by joiners and in which an electric motor which is provided with a drilling gear with a number of spindles is mounted in a supporting structure and adapted to be pressed onto and lifted from a drilling point or position.

SUMMARY OF THE INVENTION

The invention relates to a drilling machine which is particularly suitable for small and medium sized workshops and by means of which drilling operations for hinge casings and mounting plates of hinge arms, as well as drilling operations along a system row can be carried out, as required, for example, for the insertion of furniture connectors and dowels.

Moreover, fittings, for example hinges, can be pressed into furniture parts by means of machines of this type.

It is the object of the invention to design a machine of this type such that the drill feed and the insertion of the fittings can be easily changed from manual to pneumatic or hydraulic operation.

According to the invention this is achieved by a fastening plate for a hydraulic or pneumatic piston-cylinder unit for the actuation of the feed device, such fastening plate being mountable on the housing of the machine preferably by means of screws, and the unit being adapted to be screwed or clamped to a console or fixedly positioned element of the machine.

One embodiment of the invention provides a cylindrical coupling member screwable to the piston rod of the piston-cylinder unit and provided with an outer annular groove and insertable into a holding slot of the fastening plate, such coupling member holding the fastening plate with its flanges limiting the annular groove.

A further embodiment of the invention is characterized by a valve for changing the hydraulic or pneumatic system from a drill feed operation to an inserting operation, such valve being arranged in the region of the feed device and the change being effected by pivoting the pivotal lever.

The changing or reversing valve effects the change of the hydraulic or pneumatic system from the drill feed operation to the inserting operation.

BRIEF DESCRIPTION OF THE DRAWINGS

In the following an embodiment of the invention will be described in more detail with reference to the accompanying drawings, in which.

DESCRIPTION OF THE PREFERRED EMBODIMENT

Figure 1:
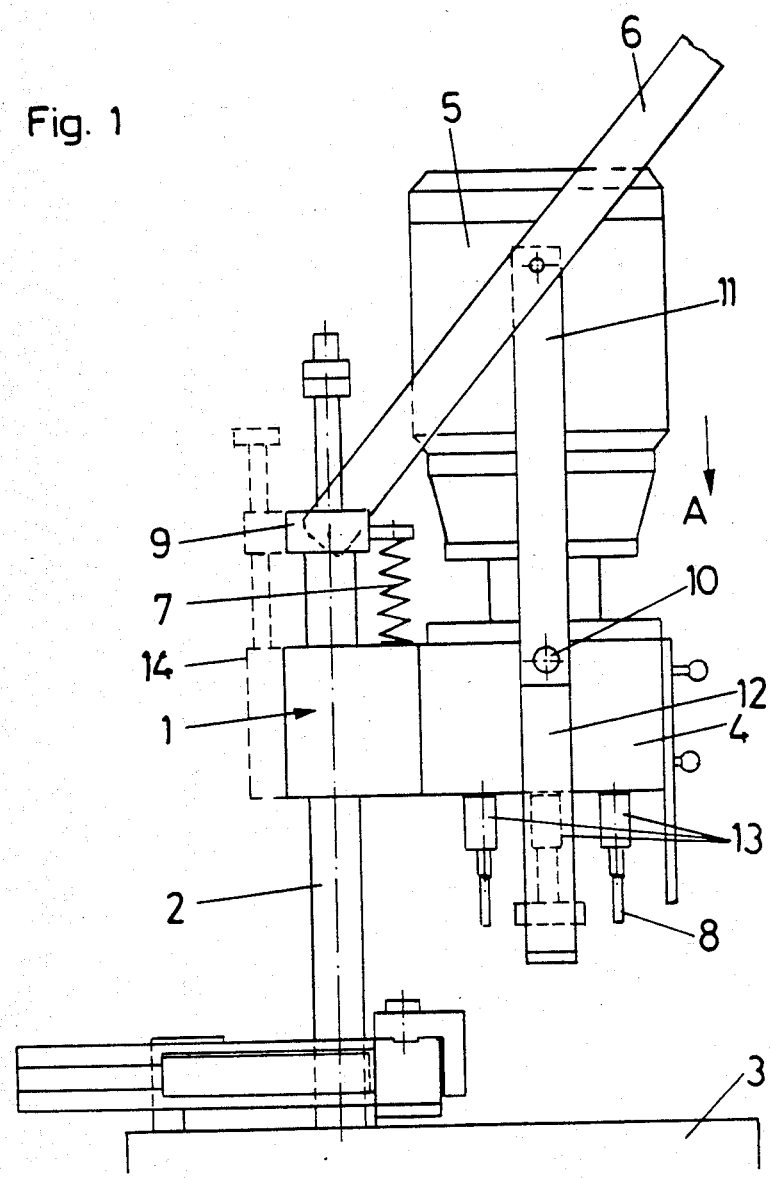
FIG. 1 is a side view of a drilling and mounting machine in accordance with the invention employed for manual operation.

The drilling machine in accordance with the invention comprises a housing 1 movable vertically along two guide columns 2, a workpiece support 3, a gear block 4 and a driving motor 5.

The gear block 4 and the driving motor 5 together with housing 1 are lowerable toward the workpiece support 3 by means of a bow-like lever 6 against the force of a tension spring 7. The lever 6 is mounted on a clamp or console 9 which is fixed to the guide columns 2. Columns 2, clamp or console 9 and support 3 form a fixedly positioned frame.

A cylindrical drill spindle support rotatable about its longitudinal center axis, i.e. about the vertical in the gear block, is provided in the gear block 4.

Drill spindles are arranged in the drill spindle support and are provided with pinions, or pinions are arranged between such spindles, and thus they are driven by the driving motor 5 via the driving shaft thereof.

Drills 8 are inserted into coupling members 13 of the drill spindles.

A pivotal lever 12 is mounted at an axle or point of linkage 10 on which the lever 6 acts by means of supporting struts 11.

During an operation of drilling dowel holes, the pivotal lever 12 is in a horizontal position. The pivotal lever 12 carries a unit for the insertion of hinge casings, mounting plates or the like.

If the machine according to the invention is to be used as a mounting machine, a hinge casing is, for example, placed into the inserting unit, the pivotal lever 12 is moved downwards into the position illustrated in FIG. 1, and the hinge casing is pressed into the furniture part by means of the lever 6.

A depth adjustment device 14 is arranged between the clamp or console 9 and the housing 1 by means of which the depth of the holes and the depth of insertion can be adjusted.

Figure 2:
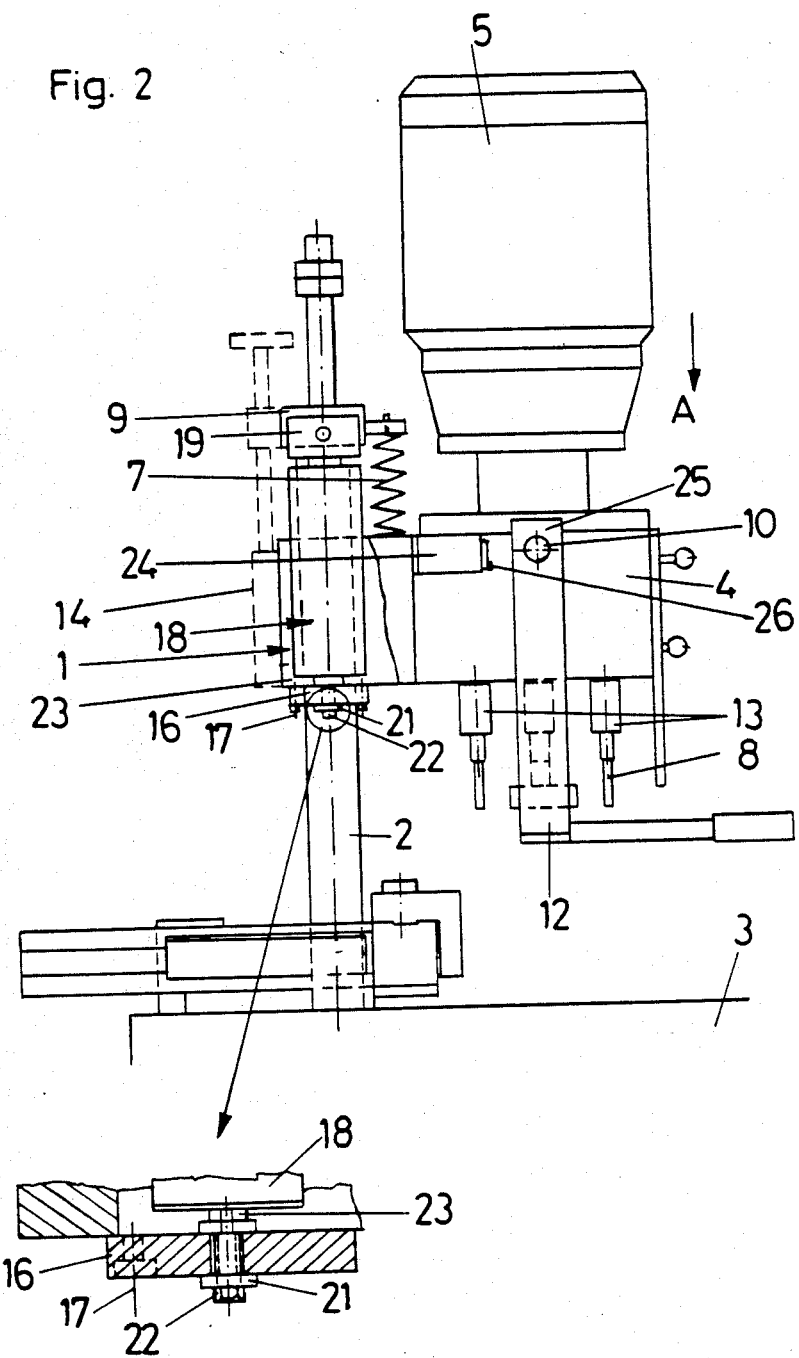
FIG. 2 is a side view of the same machine employed for hydraulic or pneumatic operation.

Threaded holes are provided at the lower end of the housing 1 so that a fastening plate 16 is screwable thereto by means of screws 17 (see FIG. 2).

A pneumatic cylinder 18 is fastenable to the console 9 by means of clips 19.

Figure 3:
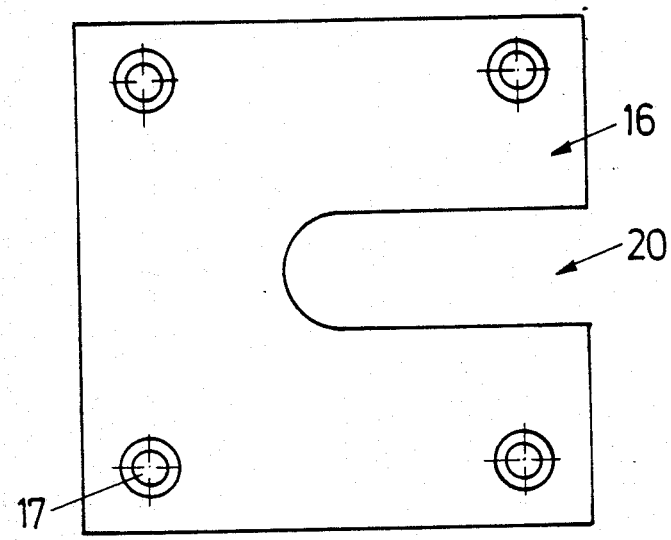
FIG. 3 is a top view of a fastening plate.
Figure 4:
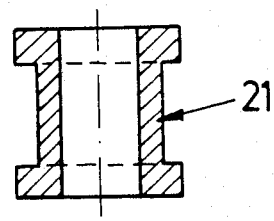
FIG. 4 is a sectional view of a coupling member.

As can be seen from FIG. 3, the fastening plate 16 is provided with an open slot 20. A coupling member 21 is insertable into slot 20 and screwed to a piston rod 23 of cylinder 18 by means of a screw 22.

Thus, the drilling and mounting machine according to the invention easily and rapidly can be changed from a manual to pneumatic operation. Obviously, a hydraulic cylinder could be used instead of a pneumatic cylinder.

In the embodiment according to FIG. 2, the drilling and mounting machine according to the invention is provided with a reversing valve 24. When the pivotal lever 12 is moved up into the horizontal position, its rear end 25 pushes on a valve lever 26, and the pressure of the pneumatic cylinder 18 is automatically adjusted for drilling operations. When the pivotal lever 12 for the insertion of a fitting is moved downwards, its upper end 25 releases the valve lever 26, and the reversing valve 24 changes automatically for inserting operations.

What is claimed is:

1. A drilling and mounting machine, alternatively operable either manually or by fluid pressure, for drilling fastening holes for furniture fittings, for example hinges, in furniture parts, and for mounting the furniture fittings in the thus drilled furniture parts, said machine comprising:

a frame;

a housing supporting a drilling mechanism including a gear block for a plurality of drill spindles and a driving motor, said housing being mounted for movement with respect to said frame;

an inserting member pivotally mounted on said housing for movement between a withdrawn position, whereat movement of said housing relative to said frame enables a drilling operation, and an inserting position, whereat movement of said housing relative to said frame enables a furniture fitting insertion operation;

manually operable feed means for moving said housing relative to said frame and comprising a lever mechanism connected to said frame and to said housing, whereby manual operation of said lever mechanism moves said housing with respect to said frame; and fluid operated feed means, operable alternatively to said manually operable feed means, for moving said housing relative to said frame, said fluid operated feed means comprising a fluid operated piston-cylinder unit having a first portion mounted on said frame, a fastening plate mounted on said housing, and means connecting a second portion of said piston-cylinder unit to said mounting plate.

2. A machine as claimed in claim 1, wherein said first portion of said piston-cylinder unit comprises the cylinder thereof, and said second portion of said piston-cylinder unit comprises a piston rod thereof.

3. A machine as claimed in claim 2, wherein said fastening plate has therein a slot, and said connecting means comprises a cylindrical coupling member connected to said piston rod, said coupling member having an outer annular groove between a pair of outwardly extending flanges, said coupling member extending into said slot in said fastening plate with said flanges of said coupling member abutting opposite surfaces of said fastening plate.

4. A machine as claimed in claim 3, wherein said coupling member is threaded onto said piston rod, said fastening plate is bolted to said housing, and said cylinder is removably connected to said frame.

5. A machine as claimed in claim 1, further comprising valve means, mounted on said housing, for changing said piston-cylinder unit between a drill feed operation and a furniture fitting feed operation, said valve means being operable by said inserting member upon pivoting thereof between said withdrawn and inserting positions thereof.

6. A machine as claimed in claim 1, wherein said lever mechanism comprises a lever pivoted to said frame and a strut pivoted at a first end thereof to said housing and at a second end thereof to said lever, and said inserting member and said first end of said strut are pivoted to said housing about a common axle.

* * * * *